(12) United States Patent
Xu et al.

(10) Patent No.: US 9,354,826 B2
(45) Date of Patent: May 31, 2016

(54) CAPACITY EXPANSION METHOD AND DEVICE

(71) Applicant: Huawei Technologies Co., Ltd., Shenzhen, Guangdong (CN)

(72) Inventors: Yan Xu, Shenzhen (CN); Yaping Sun, Hangzhou (CN); Huiqiang Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 14/454,054

(22) Filed: Aug. 7, 2014

(65) Prior Publication Data

US 2014/0351512 A1    Nov. 27, 2014

Related U.S. Application Data (63) Continuation of application No. PCT/CN2013/085078, filed on Oct. 12, 2013.

(30) Foreign Application Priority Data

Apr. 23, 2013   (CN) .......................... 2013 1 0143192

(51) Int. Cl.
*G06F 3/06*  (2006.01)

(52) U.S. Cl.
CPC ............ *G06F 3/0689* (2013.01); *G06F 3/0604* (2013.01); *G06F 3/0607* (2013.01); *G06F 3/0629* (2013.01); *G06F 3/0631* (2013.01); *G06F 3/0632* (2013.01); *G06F 3/0665* (2013.01)

(58) Field of Classification Search
CPC ... G06F 3/0689; G06F 3/0604; G06F 3/0665; G06F 3/0629; G06F 3/0631; G06F 3/0632
See application file for complete search history.

(56) References Cited

U.S. PATENT DOCUMENTS

| | | | |
|---|---|---|---|
| 5,615,352 A | 3/1997 | Jacobson et al. | |
| 2005/0132135 A1 | 6/2005 | Chien | |
| 2012/0221611 A1* | 8/2012 | Watanabe | G06F 3/0608 707/827 |

FOREIGN PATENT DOCUMENTS

| | | |
|---|---|---|
| CN | 101482800 A | 7/2009 |
| CN | 101482802 A | 7/2009 |
| CN | 101546249 A | 9/2009 |
| CN | 101587425 A | 11/2009 |
| CN | 102043589 A | 5/2011 |
| CN | 102184080 A | 9/2011 |
| CN | 103268202 A | 8/2013 |
| EP | 0 706 113 A2 | 4/1996 |
| TW | 200519876 A | 6/2005 |

* cited by examiner

*Primary Examiner* — Aracelis Ruiz (57) ABSTRACT

Embodiments of the present invention provide a capacity expansion method and device, so as to reduce the time needed by capacity expansion of a hard disk. The method specifically includes: dividing, in a distributed redundant array of independent disks RAID system, each hard disk into virtual hard disks of equal size equally; dividing an original hard disk into X groups equally; selecting m virtual hard disks from each hard disk in sequence to form one original hard disk; selecting m virtual hard disks from each added hard disk and inserting the m virtual hard disks into the virtual hard disk group; moving, in the virtual hard disk group, data in virtual hard disks of the original hard disk to the virtual hard disks of the added hard disk. The present invention is applied to capacity expansion of a hard disk.

8 Claims, 4 Drawing Sheets

CAPACITY EXPANSION METHOD AND DEVICE

CROSS-REFERENCE TO RELATED APPLICATION

This application is a continuation of International Application No. PCT/CN2013/085078, filed on Oct. 12, 2013, which claims priority to Chinese Patent Application No. 201310143192.7, filed on Apr. 23, 2013, both of which are hereby incorporated by reference in their entireties.

TECHNICAL FIELD

The present invention relates to the field of capacity expansion technologies, and in particular, to a capacity expansion method and device.

BACKGROUND

In a distributed redundant array of independent disks (Redundant Array of Independent Disks, RAID for short), a single RAID may be distributed in discrete spaces of multiple physical hard disks, so that hard disks in the system are fully used and hot spots are equally allocated to as many hard disks as possible, and the hot spots are eliminated. In addition, when a hard disk is damaged, more hard disks participate in reconstruction, so that a long reconstruction time is required. Therefore, the distributed RAID system is applied more and more widely. However, when an enterprise purchases and uses a storage system, the enterprise does not initially install a hard disk with maximum configurations, but purchases and adds hard disks according to services. For this reason, a capacity expansion issue of a distributed hard disk storage system needs to be considered.

To solve the capacity expansion issue of a hard disk, in the prior art, an original distributed RAID system is kept unchanged during the capacity expansion, and a new distributed RAID system is constructed in an added hard disk. However, this method for capacity expansion of the hard disk requires addition of many hard disks at a single time to construct a distributed RAID system with a short reconstruction time and disperse hot spots. In addition, after the capacity expansion, an original RAID group cannot be horizontally extended to an added RAID group, and the time of reconstructing the original RAID group cannot be reduced. Further, during the capacity expansion in the prior art, added hard disks are added to the original RAID group respectively, and a hard disk space is allocated by reusing a distributed RAID algorithm. This capacity expansion method does not need to add many hard disks at a single time, and therefore can reduce the time of reconstructing the original RAID group. However, during the capacity expansion, large amounts of small block data need to be migrated, which requires a long capacity expansion time.

SUMMARY

Embodiments of the present invention provide a capacity expansion method and device, so as to reduce the time needed by capacity expansion of a hard disk and improve efficiency in the capacity expansion of the hard disk.

To achieve the foregoing objective, the embodiments of the present invention use the following technical solutions:

According to a first aspect, a capacity expansion method is provided, including:

dividing, in a distributed redundant array of independent disks RAID system, each hard disk into virtual hard disks of equal size equally, where the quantity of the virtual hard disks is an integer multiple of m, where m is the maximum quantity of RAID groups that can be constructed in the distributed RAID system and m is a positive integer;

dividing the original hard disk into X groups equally, where X is the quantity of units of each strip in the distributed RAID system, the quantity of original hard disks in the distributed RAID system is an integer multiple of X, and X is a positive integer;

selecting m virtual hard disks from each hard disk to form one original hard disk, where all the original hard disks form one original hard disk group;

selecting m virtual hard disks from each original hard disk group in sequence to form one virtual hard disk group;

inserting, in the distributed RAID system, an added hard disk formed by virtual hard disks with the quantity being an integer multiple of m, where the quantity of the added hard disks is an integer multiple of X;

selecting m virtual hard disks from each added hard disk, and inserting the m virtual hard disks into the virtual hard disk group; and moving, in the virtual hard disk group, data in virtual hard disks of the original hard disk to the virtual hard disks of the added hard disk.

With reference to the first aspect, in a first possible implementation manner, after the selecting m virtual hard disks from each hard disk to form one original hard disk, the method further includes:

constructing, in all the original hard disk groups and by using a distributed RAID algorithm, a RAID in virtual hard disks with a same virtual hard disk group number.

With reference to the first aspect, in a second possible implementation manner, after the moving, in the virtual hard disk group, data in virtual hard disks of the original hard disk to the virtual hard disks of the added hard disk, the method further includes:

constructing, by using a distributed RAID algorithm, a new RAID in idle virtual hard disks of a same virtual hard disk group.

With reference to the first aspect, in a third possible implementation manner, the moving, in the virtual hard disk group, data in virtual hard disks of the original hard disk to the virtual hard disks of the added hard disk includes:

selecting, in each virtual hard disk group, original hard disks where the quantity of virtual hard disks exceeds a specific quantity in the original hard disk group, where the specific quantity is the quantity of virtual hard disks that can be allocated in each hard disk when the virtual hard disks are allocated equally; and migrating data in the virtual hard disks in the original hard disks where the quantity of virtual hard disks exceeds the specific quantity in the original hard disk group to the virtual hard disks of the added hard disk equally, where the virtual hard disks of the added hard disk and the virtual hard disks where the data needs to be moved belong to a same virtual hard disk group.

According to a second aspect, a capacity expansion device is provided, including:

a processing unit, configured to divide, in a distributed RAID system, each hard disk into virtual hard disks of equal size equally, where the quantity of the virtual hard disks is an integer multiple of m, where m is the maximum quantity of RAID groups that can be constructed in the distributed RAID system and m is a positive integer;

where the processing unit is further configured to divide the original hard disk into X groups equally, where X is the quantity of units of each strip in the distributed RAID system, the quantity of original hard disks in the distributed RAID system is an integer multiple of X, and X is a positive integer;

a selecting unit, configured to select m virtual hard disks from each hard disk to form one original hard disk, where all the original hard disks form one original hard disk group;

where the selecting unit is further configured to select m virtual hard disks from each original hard disk group in sequence to form one virtual hard disk group;

an inserting unit, configured to insert, in the distributed RAID system, an added hard disk formed by virtual hard disks with the quantity being an integer multiple of m, where the quantity of the added hard disks is an integer multiple of X;

where the selecting unit is further configured to select m virtual hard disks from each added hard disk, and insert the m virtual hard disks into the virtual hard disk group; and the processing unit is further configured to move, in the virtual hard disk group, data in virtual hard disks of the original hard disk to the virtual hard disks of the added hard disk.

With reference to the second aspect, in a first possible implementation manner, the capacity expansion device includes:

a constructing unit, configured to construct, in all the original hard disk groups and by using a distributed RAID algorithm, a RAID in virtual hard disks with a same virtual hard disk group number.

With reference to the second aspect, in a second possible implementation manner, the constructing unit is further configured to construct, by using a distributed RAID algorithm, a new RAID in idle virtual hard disks of a same virtual hard disk group.

With reference to the second aspect, in a third possible implementation manner, the processing unit includes:

a selecting subunit, configured to select, in each virtual hard disk group, original hard disks where the quantity of virtual hard disks exceeds a specific quantity in the original hard disk group, where the specific quantity is the quantity of virtual hard disks that can be allocated in each hard disk when the virtual hard disks are allocated equally; and a processing subunit, configured to migrate data in the virtual hard disks in the original hard disks where the quantity of virtual hard disks exceeds the specific quantity in the original hard disk group to the virtual hard disks of the added hard disk equally, where the virtual hard disks of the added hard disk and the virtual hard disks where the data needs to be moved belong to a same virtual hard disk group.

The capacity expansion method and device provided by the embodiments of the present invention, by dividing an original hard disk into virtual hard disks of equal size equally, adding new hard disks of a same quantity to the original hard disk, and moving data in any virtual hard disk of the original hard disk to any virtual hard disk of the new hard disks, reduces the time needed by capacity expansion of a hard disk and improves efficiency in the capacity expansion of the hard disk.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
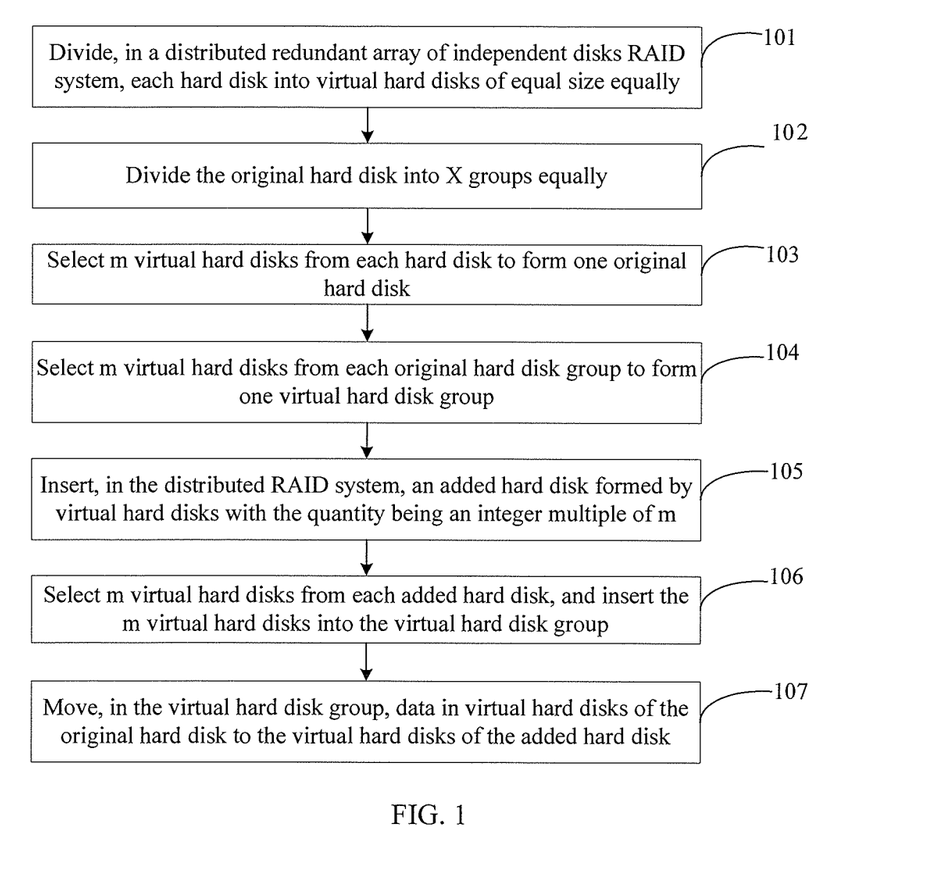
FIG. 1 is a schematic flowchart of a capacity expansion method according to an embodiment of the present invention.

An embodiment of the present invention provides a capacity expansion method applied to a distributed RAID system. As shown in FIG. 1, the method includes:

101. Divide, in a distributed redundant array of independent disks (Redundant Array Of Independent Disks, RAID for short) system, each hard disk into virtual hard disks of equal size equally.

The quantity of the virtual hard disks is an integer multiple of m, where m is the maximum quantity of RAID groups that can be constructed in the distributed RAID system and m is a positive integer.

102. Divide the original hard disk into X groups equally.

X is the quantity of units of each strip in the distributed RAID system, the quantity of original hard disks in the distributed RAID system is an integer multiple of X, and X is a positive integer.

103. Select m virtual hard disks from each hard disk to form one original hard disk.

All the original hard disks form one original hard disk group.

104. Select m virtual hard disks from each original hard disk group in sequence to form one virtual hard disk group.

105. Insert, in the distributed RAID system, an added hard disk formed by virtual hard disks with the quantity being an integer multiple of m.

The quantity of the added hard disks is an integer multiple of X.

106. Select m virtual hard disks from each added hard disk, and insert the m virtual hard disks into the virtual hard disk group.

107. Move, in the virtual hard disk group, data in virtual hard disks of the original hard disk to the virtual hard disks of the added hard disk.

New data in a whole virtual hard disk in the added hard disk in one hard disk group and data in a whole virtual hard disk in the original hard disk are migrated. This continuous migration of large block data not only maintains advantages of a traditional RAID capacity expansion but also reduces the time needed by capacity expansion, thereby implementing data exchange between the original hard disk and the added hard disk.

The capacity expansion method provided by the embodiment of the present invention, by dividing an original hard disk into virtual hard disks of equal size equally, adding new hard disks of a same quantity to the original hard disk, and moving data in any virtual hard disk of the original hard disk to any virtual hard disk of the new hard disks, reduces the time needed by capacity expansion of a hard disk and improves efficiency in the capacity expansion of the hard disk.

Figure 2:
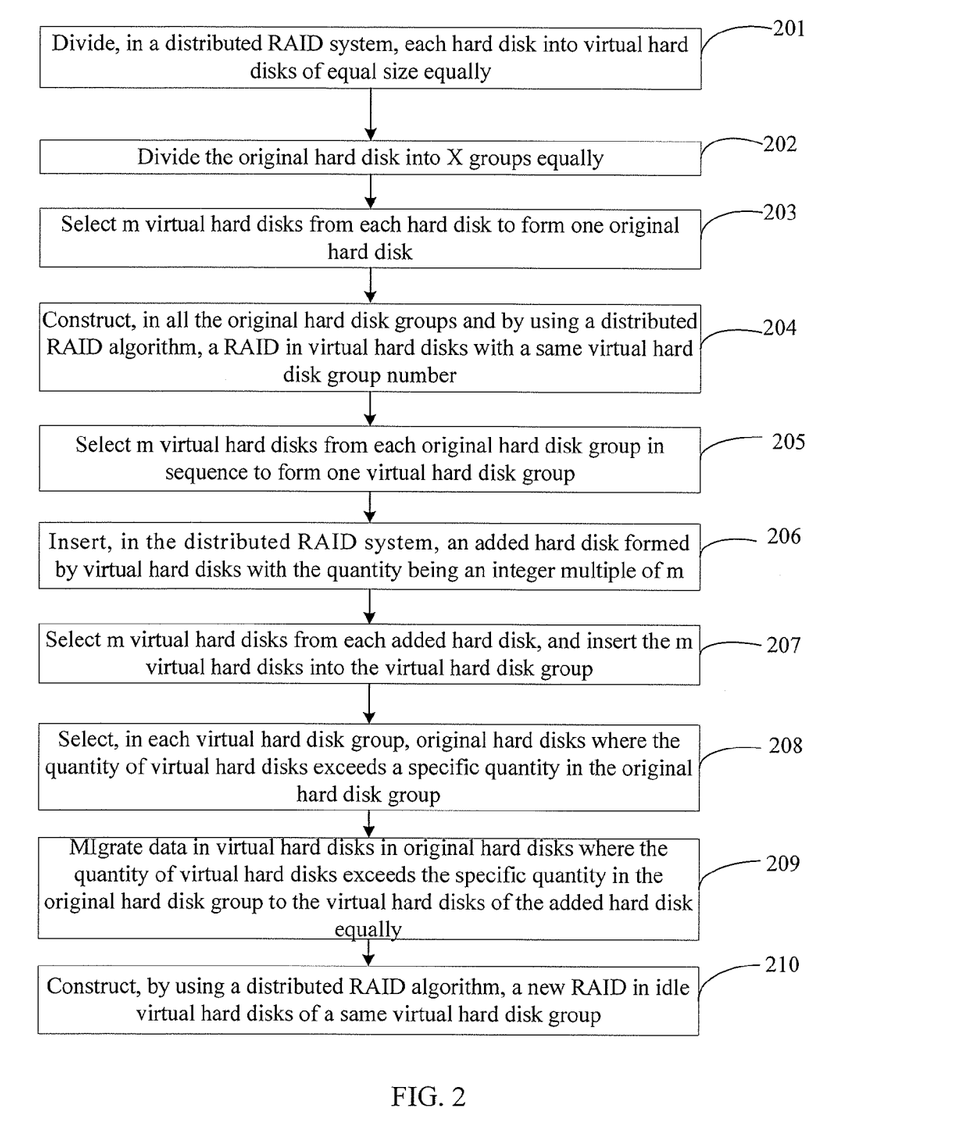
FIG. 2 is a schematic flowchart of another capacity expansion method according to an embodiment of the present invention.

An embodiment of the present invention provides a capacity expansion method. As shown in FIG. 2, the method includes:

201. Divide, in a distributed RAID system, each hard disk into virtual hard disks of equal size equally.

The quantity of the virtual hard disks is an integer multiple of m, where m is the maximum quantity of RAID groups that can be constructed in the distributed RAID system and m is a positive integer.

202. Divide the original hard disk into X groups equally.

X is the quantity of units of each strip in the distributed RAID system, the quantity of original hard disks in the distributed RAID system is an integer multiple of X, and X is a positive integer.

203. Select m virtual hard disks from each hard disk to form one original hard disk.

All the original hard disks form one original hard disk group.

204. Construct, in all the original hard disk groups and by using a distributed RAID algorithm, a RAID in virtual hard disks with a same virtual hard disk group number.

205. Select m virtual hard disks from each original hard disk group in sequence to form one virtual hard disk group.

206. Insert, in the distributed RAID system, an added hard disk formed by virtual hard disks with the quantity being an integer multiple of m.

The quantity of the added hard disks is an integer multiple of X.

207. Select m virtual hard disks from each added hard disk, and insert the m virtual hard disks into the virtual hard disk group.

208. Select, in each virtual hard disk group, original hard disks where the quantity of virtual hard disks exceeds a specific quantity in the original hard disk group.

The specific quantity is the quantity of virtual hard disks that can be allocated in each hard disk when virtual hard disks are equally allocated.

209. Migrate data in the virtual hard disks in the original hard disks where the quantity of virtual hard disks exceeds the specific quantity in the original hard disk group to the virtual hard disks of the added hard disk equally.

The virtual hard disks of the added hard disk and the virtual hard disks where the data needs to be moved belong to a same virtual hard disk group.

When data in one virtual hard disk of each hard disk of all the added hard disks is moved to one virtual hard disk of the original hard disk accordingly, step 210 is executed.

210. Construct, by using a distributed RAID algorithm, a new RAID in idle virtual hard disks of a same virtual hard disk group.

Specifically, a RAID formed by new RAIDs constructed in the idle virtual hard disks and a RAID in the distributed RAID system where the original hard disk is located belong to a same RAID group. Certainly, a user may also define, according to requirements of the user, that a RAID of an added hard disk and a RAID in the original hard disk do not belong to a same group. An integer multiple relationship exists between the quantity of the added hard disks and the quantity of the original hard disks.

The embodiment of the present invention is used to implement capacity expansion of a hard disk in a distributed system. The capacity expansion of the hard disk can be implemented quickly because all data in one virtual hard disk is moved during the capacity expansion. In addition, during the capacity expansion, data in the original hard disk is exchanged with data in the added hard disk, which re-maps a relationship between virtual hard disks and physical hard disks; and a distributed RAID algorithm is also used to construct a distributed RAID in the added hard disk. Therefore, the added hard disk can be quickly integrated into a RAID group, and the distributed RAID algorithm can be distributed to all hard disks.

New data in a whole virtual hard disk in the added hard disk in one hard disk group and data in a whole virtual hard disk in the original hard disk are migrated. This continuous migration of large block data not only maintains advantages of a traditional RAID capacity expansion but also reduces the time needed by capacity expansion, thereby implementing data exchange between the original hard disk and the added hard disk.

The capacity expansion method provided by the embodiment of the present invention, by dividing an original hard disk into virtual hard disks of equal size equally, adding new hard disks of a same quantity to the original hard disk, and moving data in any virtual hard disk of the original hard disk to any virtual hard disk of the new hard disks, reduces the time needed by capacity expansion of a hard disk and improves efficiency in the capacity expansion of the hard disk. In addition, the new hard disks can be quickly integrated into a RAID group, and a distributed RAID algorithm can be distributed to all hard disks including the added hard disks.

Figure 3:
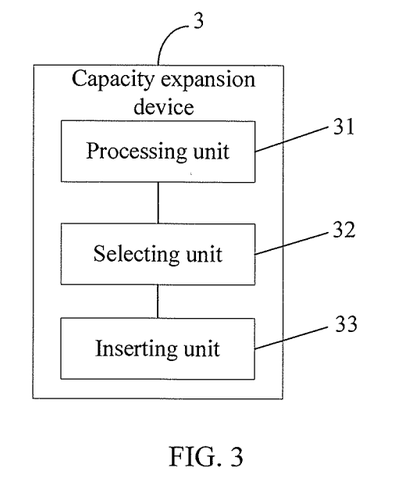
FIG. 3 is a schematic structural diagram of a capacity expansion device according to an embodiment of the present invention.

An embodiment of the present invention provides a capacity expansion device 3. As shown in FIG. 3, the capacity expansion device 3 includes a processing unit 31, a selecting unit 32, and an inserting unit 33, where:

the processing unit 31 is configured to divide, in a distributed RAID system, each hard disk into virtual hard disks of equal size equally;

where the quantity of the virtual hard disks is an integer multiple of m, where m is the maximum quantity of RAID groups that can be constructed in the distributed RAID system and m is a positive integer;

the processing unit 31 is further configured to divide the original hard disk into X groups equally;

where X is the quantity of units of each strip in the distributed RAID system, the quantity of original hard disks in the distributed RAID system is an integer multiple of X, and X is a positive integer;

the selecting unit 32 is configured to select m virtual hard disks from each hard disk to form one original hard disk;

where all the original hard disks form one original hard disk group;

the selecting unit 32 is further configured to select m virtual hard disks from each original hard disk group in sequence to form one virtual hard disk group;

the inserting unit 33 is configured to insert, in the distributed RAID system, an added hard disk formed by virtual hard disks with the quantity being an integer multiple of m;

where the quantity of the added hard disks is an integer multiple of X;

the selecting unit 32 is further configured to select m virtual hard disks from each added hard disk, and insert the m virtual hard disks into the virtual hard disk group; and the processing unit 31 is further configured to move, in the virtual hard disk group, data in virtual hard disks of the original hard disk to the virtual hard disks of the added hard disk.

Figure 4:
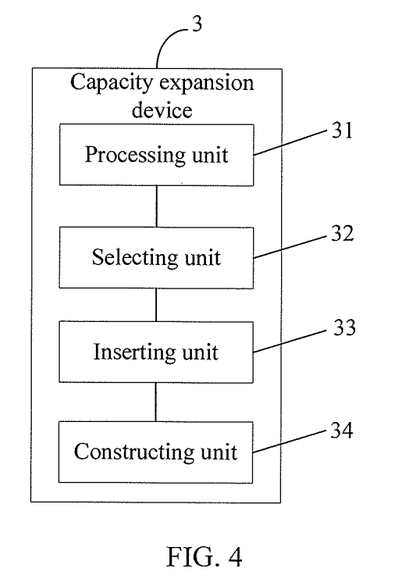
FIG. 4 is a schematic structural diagram of another capacity expansion device according to an embodiment of the present invention.

Optionally, as shown in FIG. 4, the device further includes a constructing unit 34, where:

the constructing unit 34 is configured to construct, in all the original hard disk groups and by using a distributed RAID algorithm, a RAID in virtual hard disks with a same virtual hard disk group number.

The constructing unit 34 is further configured to construct, by using a distributed RAID algorithm, a new RAID in idle virtual hard disks of a same virtual hard disk group.

Figure 5:
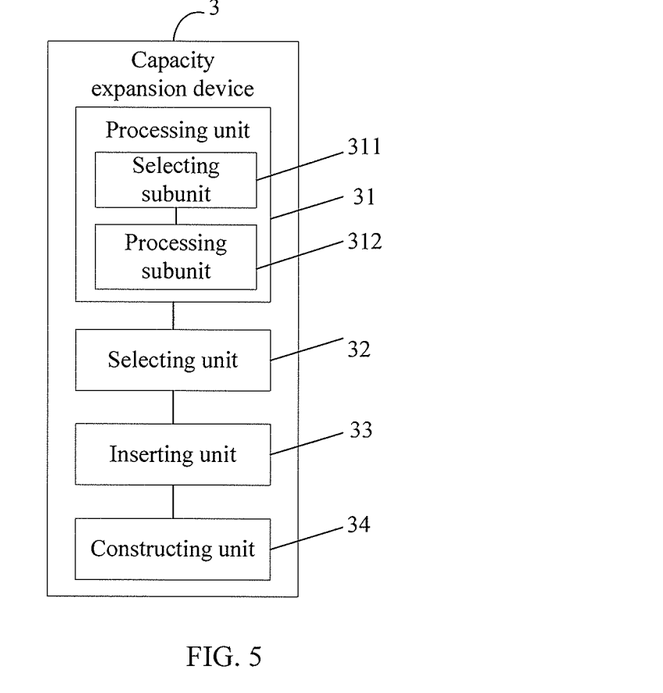
FIG. 5 is a schematic structural diagram of still another capacity expansion device according to an embodiment of the present invention.

Further, as shown in FIG. 5, the processing unit of the device includes a selecting subunit 311 and a processing subunit 312, where:

the selecting subunit 311 is configured to select, in each virtual hard disk group, original hard disks where the quantity of virtual hard disks exceeds a specific quantity in the original hard disk group;

where the specific quantity is the quantity of virtual hard disks that can be allocated in each hard disk when virtual hard disks are equally allocated;

the processing subunit 312 is configured to migrate data in the virtual hard disks in the original hard disks where the quantity of virtual hard disks exceeds the specific quantity in the original hard disk group to the virtual hard disks of the added hard disk equally;

where the virtual hard disks of the added hard disk and the virtual hard disks where the data needs to be moved belong to a same virtual hard disk group.

The capacity expansion device provided by the embodiment of the present invention, by dividing an original hard disk into virtual hard disks of equal size equally, adding new hard disks of a same quantity to the original hard disk, and moving data in any virtual hard disk of the original hard disk to any virtual hard disk of the new hard disks, reduces the time needed by capacity expansion of a hard disk and improves efficiency in the capacity expansion of the hard disk. In addition, the new hard disks can be quickly integrated into a RAID group, and a distributed RAID algorithm can be distributed to all hard disks including the added hard disks.

Figure 6:
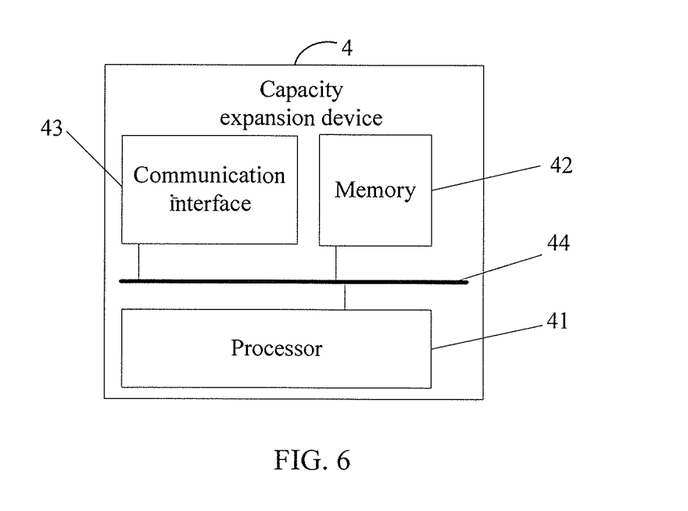
FIG. 6 is a schematic structural diagram of a capacity expansion device according to another embodiment of the present invention.

An embodiment of the present invention provides a capacity expansion device 4. As shown in FIG. 6, the capacity expansion 4 includes at least one processor 41, a memory 42, a communication interface 43, and a bus 44, where the at least one processor 41, the memory 42, and the communication interface 43 are connected and implement mutual communications through the bus 44.

The bus 44 may be an industry standard architecture (Industry Standard Architecture, ISA for short) bus, a peripheral component interconnect (Peripheral Component Interconnect, PCI for short) bus, or an extended industry standard architecture (Extended Industry Standard Architecture, EISA for short) bus, and the like. The bus 44 may be classified into an address bus, a data bus, a control bus, or the like. For the convenience of representation, the bus in FIG. 6 is represented by using one solid line only, but it does not mean that there is only one bus or one type of buses. In FIG. 6:

The memory 42 is configured to store executable program code, where the program code includes a computer operation instruction. The memory 42 may include a high speed RAM memory, and may also include a non-volatile memory (non-volatile memory), for example, at least one disk memory.

The processor 41 may be a central processing unit (Central Processing Unit, CPU for short), or be an application specific integrated circuit (Application Specific Integrated Circuit, ASIC for short), or be configured as one or more integrated circuits in the embodiment of the present invention.

The communication interface 43 is mainly configured to implement communications between apparatuses provided in this embodiment.

The processor 41 is further configured to invoke program code in the memory 42 to execute the following operations:

dividing, in a distributed redundant array of independent disks RAID system, each hard disk into virtual hard disks of equal size equally;

where the quantity of the virtual hard disks is an integer multiple of m, where m is the maximum quantity of RAID groups that can be constructed in the distributed RAID system and m is a positive integer;

dividing the original hard disk into X groups equally;

where X is the quantity of units of each strip in the distributed RAID system, the quantity of original hard disks in the distributed RAID system is an integer multiple of X, and X is a positive integer;

selecting m virtual hard disks from each hard disk to form one original hard disk;

where all the original hard disks form one original hard disk group;

selecting m virtual hard disks from each original hard disk group in sequence to form one virtual hard disk group;

inserting, in the distributed RAID system, an added hard disk formed by virtual hard disks with the quantity being an integer multiple of m; where the quantity of the added hard disks is an integer multiple of X;

selecting m virtual hard disks from each added hard disk, and inserting the m virtual hard disks into the virtual hard disk group; and moving, in the virtual hard disk group, data in virtual hard disks of the original hard disk to the virtual hard disks of the added hard disk.

Optionally, the processor 41 is further configured to execute the following steps:

constructing, in all the original hard disk groups and by using a distributed RAID algorithm, a RAID in virtual hard disks with a same virtual hard disk group number; and constructing, by using a distributed RAID algorithm, a new RAID in idle virtual hard disks of a same virtual hard disk group.

Further, the processor 41 is further configured to execute the following steps:

selecting, in each virtual hard disk group, original hard disks where the quantity of virtual hard disks exceeds a specific quantity in the original hard disk group;

where the specific quantity is the quantity of virtual hard disks that can be allocated in each hard disk when virtual hard disks are equally allocated; and migrating data in the virtual hard disks in the original hard disks where the quantity of virtual hard disks exceeds the specific quantity in the original hard disk group to the virtual hard disks of the added hard disk equally;

where the virtual hard disks in the added hard disk and the virtual hard disks where the data needs to be moved belong to a same virtual hard disk group.

The capacity expansion device provided by the embodiment of the present invention, by dividing an original hard disk into virtual hard disks of equal size equally, adding new hard disks of a same quantity to the original hard disk, and moving data in any virtual hard disk of the original hard disk to any virtual hard disk of the new hard disks, reduces the time needed by capacity expansion of a hard disk and improves efficiency in the capacity expansion of the hard disk. In addition, the new hard disks can be quickly integrated into a RAID group, and a distributed RAID algorithm can be distributed to all hard disks including the added hard disks.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A capacity expansion method, comprising:
   dividing, in a distributed redundant array of independent disks (RAID) system, each hard disk into virtual hard disks of equal size equally, wherein a quantity of the virtual hard disks is an integer multiple of m, wherein m is a maximum quantity of RAID groups that can be constructed in the distributed RAID system and m is a positive integer;
   dividing an original hard disk into X groups equally, wherein X is a quantity of units of each strip in the distributed RAID system, a quantity of original hard disks in the distributed RAID system is an integer multiple of X, and X is a positive integer;
   selecting m virtual hard disks from each hard disk to form one original hard disk, wherein all the original hard disks form one original hard disk group;
   selecting m virtual hard disks from each original hard disk group in sequence to form one virtual hard disk group;
   inserting, in the distributed RAID system, an added hard disk formed by virtual hard disks with a quantity being an integer multiple of m, wherein the quantity of the added hard disks is an integer multiple of X;
   selecting m virtual hard disks from each added hard disk, and inserting the m virtual hard disks into the virtual hard disk group; and
   moving, in the virtual hard disk group, data in virtual hard disks of the original hard disk to the virtual hard disks of the added hard disk.

2. The method according to claim 1, wherein after selecting m virtual hard disks from each hard disk to form one original hard disk, the method further comprises:
   constructing, in all the original hard disk groups and by using a distributed RAID algorithm, a RAID in virtual hard disks with a same virtual hard disk group number.

3. The method according to claim 1, wherein after moving, in the virtual hard disk group, data in virtual hard disks of the original hard disk to the virtual hard disks of the added hard disk, the method further comprises:
   constructing, by using a distributed RAID algorithm, a new RAID in idle virtual hard disks of a same virtual hard disk group.

4. The method according to claim 1, wherein moving, in the virtual hard disk group, data in virtual hard disks of the original hard disk to the virtual hard disks of the added hard disk comprises:
   selecting, in each virtual hard disk group, original hard disks where the quantity of virtual hard disks exceeds a specific quantity in the original hard disk group, wherein the specific quantity is a quantity of virtual hard disks that can be allocated in each hard disk when the virtual hard disks are allocated equally; and
   migrating data in the virtual hard disks in the original hard disks where the quantity of virtual hard disks exceeds the specific quantity in the original hard disk group to the virtual hard disks of the added hard disk equally, wherein the virtual hard disks of the added hard disk and the virtual hard disks where the data needs to be moved belong to a same virtual hard disk group.

5. A capacity expansion device, comprising:
   a processing unit, configured to divide, in a distributed redundant array of independent disks (RAID), system, each hard disk into virtual hard disks of equal size equally, wherein a quantity of the virtual hard disks is an integer multiple of m, wherein m is a maximum quantity of RAID groups that can be constructed in the distributed RAID system and m is a positive integer;
   wherein the processing unit is further configured to divide an original hard disk into X groups equally, wherein X is a quantity of units of each strip in the distributed RAID system, a quantity of original hard disks in the distributed RAID system is an integer multiple of X, and X is a positive integer;
   a selecting unit, configured to select m virtual hard disks from each hard disk to form one original hard disk, wherein all the original hard disks form one original hard disk group;
   wherein the selecting unit is further configured to select m virtual hard disks from each original hard disk group in sequence to form one virtual hard disk group;
   an inserting unit, configured to insert, in the distributed RAID system, an added hard disk formed by virtual hard disks with a quantity being an integer multiple of m, wherein the quantity of the added hard disks is an integer multiple of X;
   wherein the selecting unit is further configured to select m virtual hard disks from each added hard disk, and insert the m virtual hard disks into the virtual hard disk group; and
   the processing unit is further configured to move, in the virtual hard disk group, data in virtual hard disks of the original hard disk to the virtual hard disks of the added hard disk.

6. The device according to claim 5, comprising:
   a constructing unit, configured to construct, in all the original hard disk groups and by using a distributed RAID algorithm, a RAID in virtual hard disks with a same virtual hard disk group number.

7. The device according to claim 5, wherein:
   the constructing unit is further configured to construct, by using a distributed RAID algorithm, a new RAID in idle virtual hard disks of a same virtual hard disk group.

8. The device according to claim 5, wherein the processing unit comprises:
   a selecting subunit, configured to select, in each virtual hard disk group, original hard disks where the quantity of virtual hard disks exceeds a specific quantity in the original hard disk group, wherein the specific quantity is a quantity of virtual hard disks that can be allocated in each hard disk when the virtual hard disks are allocated equally; and
   a processing subunit, configured to migrate data in the virtual hard disks in the original hard disks where the quantity of virtual hard disks exceeds the specific quantity in the original hard disk group to the virtual hard disks of the added hard disk equally, wherein the virtual hard disks of the added hard disk and the virtual hard disks where the data needs to be moved belong to a same virtual hard disk group.

* * * * *